(12) United States Patent
Wu et al.

(10) Patent No.: US 12,267,557 B2
(45) Date of Patent: Apr. 1, 2025

(54) VIDEO CONTENT RECOMMENDATION METHOD AND APPARATUS, AND COMPUTER DEVICE

(71) Applicant: SHANGHAI BILIBILI TECHNOLOGY CO., LTD., Shanghai (CN)

(72) Inventors: Junhao Wu, Shanghai (CN); Peng Xie, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/014,339

(22) PCT Filed: Jun. 22, 2021

(86) PCT No.: PCT/CN2021/101626
§ 371 (c)(1),
(2) Date: Jan. 3, 2023

(87) PCT Pub. No.: WO2022/007626
PCT Pub. Date: Jan. 13, 2022

(65) Prior Publication Data
US 2023/0300417 A1    Sep. 21, 2023

(30) Foreign Application Priority Data
Jul. 6, 2020 (CN) .......................... 202010645506.3

(51) Int. Cl.
*H04N 21/466* (2011.01)
*H04N 21/45* (2011.01)

(52) U.S. Cl.
CPC ..... *H04N 21/4668* (2013.01); *H04N 21/4532* (2013.01)

(58) Field of Classification Search
CPC ........... H04N 21/4668; H04N 21/4532; H04N 21/8456; G06F 16/732
See application file for complete search history.

(56) References Cited

U.S. PATENT DOCUMENTS 9,152,708 B1 * 10/2015 He ....................... G06F 16/7867
10,657,144 B2 * 5/2020 Lewis ................ H04N 21/4532
(Continued)

FOREIGN PATENT DOCUMENTS

CN    103440335 A    12/2013
CN    109522426 A    3/2019
(Continued)

OTHER PUBLICATIONS

International Patent Application No. PCT/CN2021/101626; Int'l Search Report; dated Sep. 15, 2021; 3 pages.

*Primary Examiner* — Kunal Langhnoja
(74) *Attorney, Agent, or Firm* — BakerHostetler

(57) ABSTRACT

This application provides techniques of improving video recommendation. The techniques comprise temporarily pre-adding a first video to a recommendation video sequence; capturing a sub-sequence including the first video; modifying an initial recommendation score of the first video based on a position sequence number of the first video in the sub-sequence and a position sequence number of another video in the sub-sequence to obtain a modified recommendation score of the first video, the another video sharing a target attribute with the first video; and adding a video with a highest modified recommendation score to the recommendation video sequence.

14 Claims, 3 Drawing Sheets

User terminal

Computer device 1

(56) References Cited

U.S. PATENT DOCUMENTS

| | | | |
|---|---|---|---|
| 11,070,881 B1* | 7/2021 | Srinivasaraghavan | ..................... H04N 21/84 |
| 11,244,017 B2* | 2/2022 | Sayyadi | ................ G06F 16/483 |
| 2019/0286673 A1 | 9/2019 | Sayyadi-Harikandehei et al. | |

FOREIGN PATENT DOCUMENTS

| | | |
|---|---|---|
| CN | 109710805 A | 5/2019 |
| CN | 110096613 A | 8/2019 |
| CN | 110730369 A | 1/2020 |
| CN | 112423134 A | 2/2021 |

* cited by examiner

User terminal    Computer device 1

VIDEO CONTENT RECOMMENDATION METHOD AND APPARATUS, AND COMPUTER DEVICE

CROSS-REFERENCE TO RELATED APPLICATIONS

This application is the U.S. National Stage of International Application No. PCT/CN2021/101626, filed on Jun. 22, 2021, which claims priority to Chinese Patent Application No. 202010645506.3, filed with the China National Intellectual Property Administration on Jul. 6, 2020, and entitled "VIDEO CONTENT RECOMMENDATION METHOD AND APPARATUS AND COMPUTER DEVICE", both of which are incorporated herein by reference in their entireties.

TECHNICAL FIELD

This application relates to the field of Internet technologies, and in particular, to a video content recommendation method and apparatus and a computer device.

BACKGROUND

With development of Internet technologies, a large quantity of video data is uploaded to a video platform every day, and then a user may select and play corresponding video content based on the video platform. The video platform generally provides a content recommendation function to improve user viscosity of the video platform. However, the inventors recognize that, in most existing video platforms, a video recommendation system thereof generally retrieves a specific quantity of to-be-selected sets from a video library according to personalized interests of a user, then scores and sorts these to-be-selected sets, and then recommends the to-be-selected sets to a corresponding user end. A larger quantity of taps or longer viewing duration of a type of video by a user leads to a larger quantity of recommended videos of this type, and taps of this type of recommended video by the user further enhance recommendation of this type of videos.

SUMMARY

This application provides a video content recommendation method and apparatus and a computer device, which can resolve a problem in the prior art that there is a lack of diversity and poor recommendation flexibility in a video content recommendation process.

First, to implement the foregoing objective, this application provides a video content recommendation method, where the method includes:
successively selecting a to-be-selected video from a to-be-selected video set and pre-adding it as a first video to the last order position of a recommended video sequence;
capturing, in the recommended video sequence, a video sequence segment of a preset quantity of videos that include the first video; obtaining a target attribute and an initial recommendation score of the first video; searching the video sequence segment for a target video with the target attribute other than the first video, and counting a quantity n of target videos; modifying the initial recommendation score of the first video according to n and a sorting distance between each target video and the first video, to obtain a modified recommendation score; putting the first video back to the to-be-selected video set; and selecting a video with a highest modified recommendation score from the to-be-selected video set and adding it to the last order location of the to-be-recommended video sequence.

In an example, the obtaining a target attribute of the first video includes: when the target attribute of the first video is empty, marking a preset video attribute on the first video, and using the video attribute as the target attribute of the first video.

In an example, the modifying the initial recommendation score of the first video according to n and a sorting distance between each target video and the first video, to obtain a modified recommendation score includes: when n is greater than or equal to a preset threshold N, setting the modified recommendation score of the first video to 0.

In an example, the modifying the initial recommendation score of the first video according to n and a sorting distance between each target video and the first video, to obtain a modified recommendation score includes: when n is less than the preset threshold N, obtaining a location sequence number i of the target video in the video sequence segment and a location sequence number k of the first video in the video sequence segment; and modifying the initial recommendation score according to i, k, and a preset modification formula.

In an example, the target attribute includes a tag attribute and an uploader attribute, and the modification formula includes:

$$\text{score}'_k = \frac{\text{score}_k}{\text{count}(\text{tags}_k)} * \left( \sum_{tag=1}^{count(tags_k)} \prod_{i=0}^{k-1} \left(1 - \frac{1}{\text{count}(\text{tags}_i)} * \text{demote}(\text{distance}(i,k), \text{tag})\right) \right) * \prod_{i=0}^{k-1}(1 - \text{demote}(\text{distance}(i,k), \text{up})):$$

where $\text{score}_k$ is the initial recommendation score of the first video, $\text{score}'_k$ is the modified recommendation score of the first video, $\text{count}(\text{tags}_k)$ is a quantity of tag attributes of the first video, $\text{count}(\text{tags}_i)$ is a quantity of tag attributes of the target video, $\text{demote}(\text{distance}(i,k), \text{tag})$ is a first modification function, $\text{demote}(\text{distance}(i,k), \text{up})$ is a second modification function, tag is the tag attribute, and up is the uploader attribute.

In an example, the first modification function and the second modification function are attenuation functions whose value domain is [0, 1] and include a linear function or a quadratic function.

In an example, when both the first modification function and the second modification function are half-life functions, the modification formula includes:

$$\text{score}'_k = \frac{\text{score}_k}{\text{count}(\text{tags}_k)} * \left( \sum_{tag=1}^{count(tags_k)} \prod_{i=0}^{k-1}\left(1 - \frac{1}{\text{count}(\text{tags}_i)}\left(\frac{1}{2}\right)^{\frac{distance(i,k)}{T_{tag}}}\right)\right) * \prod_{i=0}^{k-1}\left(1 - \left(\frac{1}{2}\right)^{\frac{distance(i,k)}{T_{up}}}\right); \quad (12)$$

where $T_{tag}$ is a preset attenuation constant according to the tag attribute, and $T_{up}$ is a preset attenuation constant according to the uploader attribute.

In an example, the modifying the initial recommendation score of the first video according to n and a sorting distance between each target video and the first video, to obtain a modified recommendation score includes: obtaining a corresponding target user attribute from a user terminal for which recommendation is performed; and modifying the initial recommendation score of the first video according to n and the sorting distance between each target video and the first video with reference to the target user attribute and/or a video type of the first video, to obtain a modified recommendation score corresponding to the target user.

In addition, to implement the foregoing objective, this application further provides a video content recommendation apparatus, where the apparatus includes:

a pre-adding module, configured to successively select a to-be-selected video from a to-be-selected video set and pre-add it as a first video to the last position of a recommended video sequence; a capturing module, configured to capture, in the recommended video sequence, a video sequence segment of a preset quantity of videos that include the first video; an obtaining module, configured to obtain a target attribute and an initial recommendation score of the first video; a searching module, configured to: search the video sequence segment for a target video with the target attribute other than the first video, and count a quantity n of target videos; a modification module, configured to modify the initial recommendation score of the first video according to n and a sorting distance between each target video and the first video, to obtain a modified recommendation score; a selection module, configured to put the first video back to the to-be-selected video set; and select a video with a highest modified recommendation score from the to-be-selected video set and add it to the last position of the to-be-recommended video sequence.

Further, this application further provides a computer device, where the computer device includes a memory and a processor, computer-readable instructions that can be run on the processor are stored in the memory, and the computer-readable instructions are executed by the processor to implement the following steps:

successively selecting a to-be-selected video from a to-be-selected video set and pre-adding it as a first video to the last position of a recommended video sequence; capturing, in the recommended video sequence, a video sequence segment of a preset quantity of videos that include the first video; obtaining a target attribute and an initial recommendation score of the first video; searching the video sequence segment for a target video with the target attribute other than the first video, and counting a quantity n of target videos; modifying the initial recommendation score of the first video according to n and a sorting distance between each target video and the first video, to obtain a modified recommendation score; putting the first video back to the to-be-selected video set; and selecting a video with a highest modified recommendation score from the to-be-selected video set and adding it to the last position of the to-be-recommended video sequence.

Further, to implement the foregoing objective, this application further provides a computer-readable storage medium, where the computer-readable storage medium stores computer-readable instructions, and the computer-readable instructions can be executed by at least one processor to enable the at least one processor to perform the following steps:

successively selecting a to-be-selected video from a to-be-selected video set and pre-adding it as a first video to the last position of a recommended video sequence; capturing, in the recommended video sequence, a video sequence segment of a preset quantity of videos that include the first video; obtaining a target attribute and an initial recommendation score of the first video; searching the video sequence segment for a target video with the target attribute other than the first video, and counting a quantity n of target videos; modifying the initial recommendation score of the first video according to n and a sorting distance between each target video and the first video, to obtain a modified recommendation score; putting the first video back to the to-be-selected video set; and selecting a video with a highest modified recommendation score from the to-be-selected video set and adding it to the last position of the to-be-recommended video sequence.

According to the video content recommendation method and apparatus, the computer device, and the computer-readable storage medium that are proposed in this application, a to-be-selected video from a to-be-selected video set can be pre-added as a first video to a recommended video sequence; a video sequence segment that includes the first video is captured; an initial recommendation score of the first video is modified according to a location sequence number of the first video in the video sequence segment and a location sequence number of another video with a target attribute of the first video in the video sequence segment to obtain a modified recommendation score; and finally a final to-be-selected video is selected and added to the recommended video sequence according to the modified recommendation score. Therefore, diversity control is implemented by accumulating negative influence of all same type of videos according to similar videos. Therefore, diversity of recommendation content is improved, and flexibility of a recommendation manner is improved.

DESCRIPTION OF EMBODIMENTS

The applicant finds that, in the prior art, a manner of recommending a video easily leads to continuous or high frequency occurrence of a same type of video, thereby reducing a user's viewing intention and affecting user experience. In other words, in an existing video recommendation system, it is difficult to ensure diversity of recommended videos, and recommendation flexibility is insufficient.

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the terms "first" and "second" in this application are merely used for description, and shall not be understood as an indication or implication of relative importance or an implicit indication of a quantity of indicated technical features. Therefore, features limited by "first" or "second" may explicitly or implicitly include at least one of the features. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Figure 1:
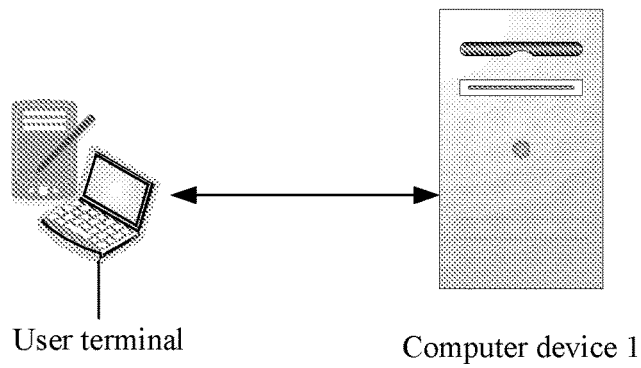
FIG. 1 is a schematic diagram of an application environment according to an embodiment of this application.

FIG. 1 is a schematic diagram of an application environment according to an embodiment of this application. Referring to FIG. 1, the computer device 1 is connected to a user terminal. The computer device 1 can obtain user information and a user behavior record that are on the user terminal, where the user information includes information such as a user gender, an occupation, an age, and a region. The user behavior record includes a user viewing record, a favorite record, a click record, and a like record. The computer device 1 analyzes, according to the user information and the user behavior record of the user terminal, an interest point of a user corresponding to the user terminal. For example, by collecting statistics about a user viewing record, it is found that the user has a relatively large quantity of times of watching, favorites, clicking, or liking videos of some video types, so as to analyze a video preference of the user for the video type.

Next, the computer device 1 selects a preset quantity of videos from a video resource server or a database (not shown in FIG. 1) according to the interest point of the user as a to-be-selected video set. Certainly, in addition to adding a video that matches the interest point of the user to the to-be-selected video set, the computer device 1 further selects another popular video, for example, selecting a popular video according to a video like rate/follow rate/interactive rate/click rate or a score, to be added to the to-be-selected video set, so as to be subsequently recommended to the user terminal corresponding to the user.

In this embodiment, the user terminal may be used as a mobile phone, a tablet, a portable device, a PC, another electronic device with a display function, or the like. The computer device 1 may be used as a PC, a data server, or the like.

Embodiment 1

Figure 2:
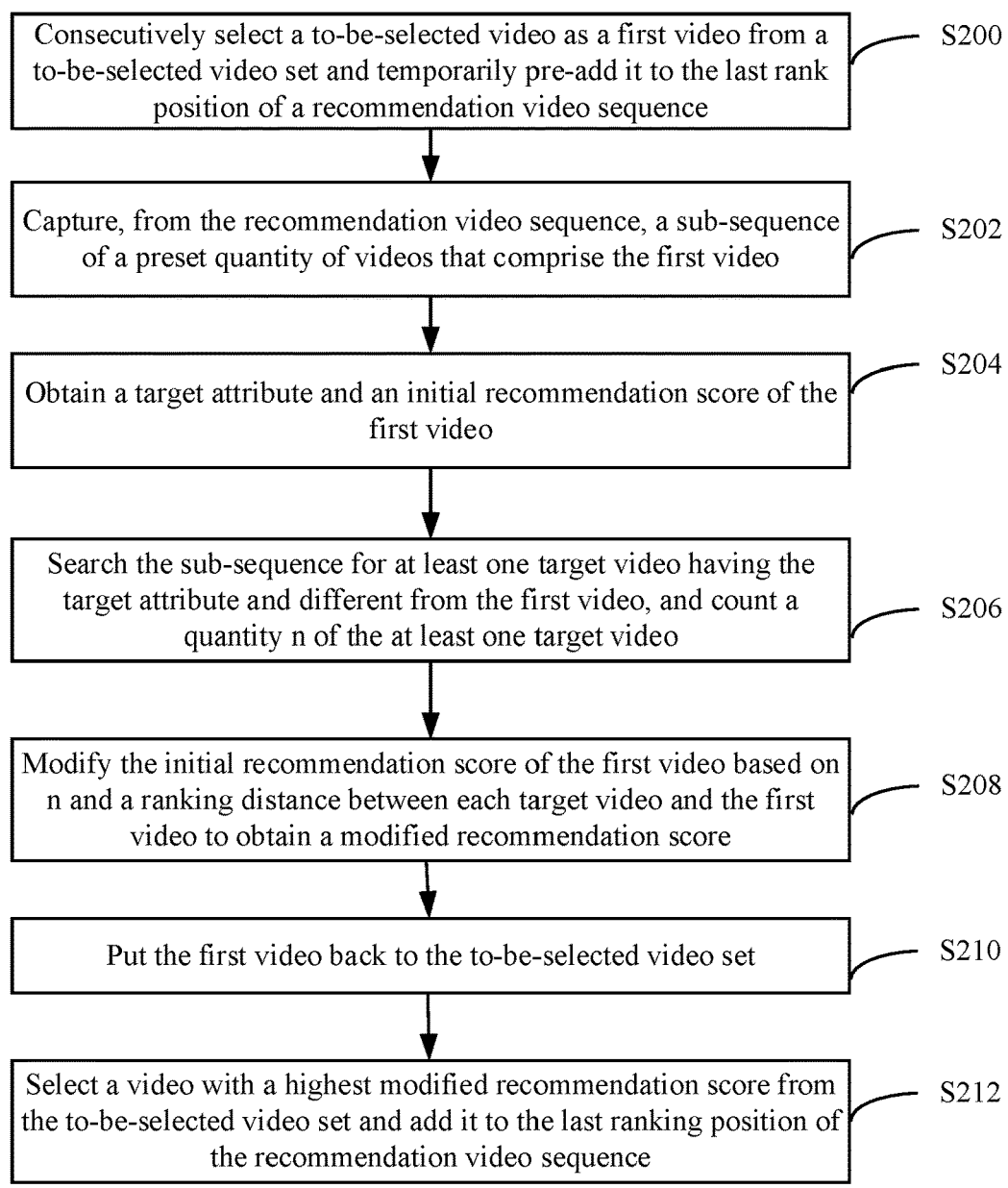
FIG. 2 is a schematic flowchart of a specific embodiment of a video content recommendation method according to this application.

FIG. 2 is a schematic flowchart of an embodiment of a video content recommendation method according to this application. It may be understood that the flowchart in this method embodiment is not used to limit a sequence of performing steps. The following is described by using an example in which a computer device 1 is an execution body.

As shown in FIG. 2, the video content recommendation method may include steps S200 to S206.

Step S200: Consecutively select a to-be-selected video as a first video from a to-be-selected video set and temporarily pre-add it to the last rank position of a recommendation video sequence.

Step S202: Capture, from the recommendation video sequence, a sub-sequence comprising a preset quantity of videos and comprising the first video.

Step S204: Obtain a target attribute and an initial recommendation score of the first video.

Specifically, the computer device 1 is configured to select a preset quantity of videos according to an interest point of a user, and select a specific quantity of popular videos to add to the to-be-selected video set together. Next, the computer device 1 is further configured to consecutively select a to-be-selected video as a first video from the to-be-selected video set and temporarily pre-adds it to the last rank position of the recommendation video sequence. In this embodiment, pre-addition is only temporary addition, and the computer device 1 consecutively pre-adds the to-be-selected video in the to-be-selected video set to the recommendation video sequence, so that a recommendation score of the to-be-selected video that is temporality pre-added to the recommendation video sequence can be subsequently modified.

After the computer device 1 temporarily pre-adds the to-be-selected video in the to-be-selected video set, i.e., the first video, to the recommendation video sequence, the computer device 1 is further configured to capture a sub-sequence from the recommendation video sequence. The sub-sequence comprises a preset quantity of recommendation videos starting from and including the first video in a reverse ranking direction of the recommendation video sequence.

After the vsub-sequence is captured, the computer device 1 obtains the target attribute and the initial recommendation score of the first video. In this embodiment, the target attribute includes a tag attribute and an uploader attribute. Specifically, for example, when the user uploads a video to a video data server, the video is generally marked with a tag attribute, such as a cartoon tag, a funny video tag, and an entertainment variety show tag. Then, the video uploaded to the video data server automatically carries information about the user uploading the video, that is, the uploader attribute.

Certainly, the video in the to-be-selected video set further includes an initial recommendation score, and the initial recommendation score may be understood as a recommendation weight value evaluated for the video when the computer device 1 adds the video to the to-be-selected video set. In this embodiment, the recommendation weight value may be calculated according to a like rate/follow rate/interactive rate/click rate of the video, or may be obtained by means of evaluation by a viewing user, or may be obtained by means of comprehensive evaluation through manual evaluation on a video playback status and a video rating status.

Because the computer device 1 obtains a specific quantity of videos from the video data server as the to-be-selected video set, the computer device 1 may obtain the target attribute of the first video and obtain the initial recommendation score of the first video.

In an example, the target attribute includes any attribute extracted according to related information of the video, and the related information includes but is not limited to a category, an introduction, uploader information, uploader information, comment information, bullet-screen comment information, and the like of the video. In an example, the target attribute may be determined by analyzing the foregoing related information and extracting a keyword from the foregoing information.

In a specific embodiment, the target attribute includes but is not limited to tag attribute and/or an uploader attribute of the target video. Herein, the computer device 1 may determine the tag attribute of the first video according to a video type, a title, an introduction, uploader information, and the like of the first video. The computer device 1 may determine the uploader attribute according to the uploader information of the first video, such as a domain of the uploader, a quantity of fans, a category of a history uploaded video, a keyword of the history uploaded video, a gender, an age, and a hobby.

In a specific embodiment, when the computer device obtains the target attribute of the first video, the target attribute of the first video is empty, the computer device 1 marks a preset video attribute on the first video, and then uses the video attribute as the target attribute of the first video. For example, when the first video is uploaded by the user without a tag, the computer device 1 cannot obtain the tag attribute of the first video, or the obtained tag attribute is an invalid tag, for example, the tag does not belong to a preset standard tag, or is displayed in messy code. Then, the computer device 1 adds a preset tag attribute to the first video.

Step S206: Search the sub-sequence and identify at least one target video in the sub-sequence, the at least one target video having the target attribute and being different from the first video; and count a quantity n of the at least one target video.

Step S208: Modify the initial recommendation score of the first video based on the quantity n and a ranking distance between each of the at least one target video and the first video to obtain a modified recommendation score. For example, after obtaining the target attribute of the first video, the computer device 1 is further configured to obtain an attribute value of another video in the sub-sequence of recommendation video, finds a video that has the target attribute as the target video, and counts a quantity n of all target videos comprised in the sub-sequence.

In this embodiment, the computer device 1 presets a video recommendation rule. For example, to ease fatigue of watching the video by the user, a specific quantity of same target attributes cannot be exceeded in a preset section of the recommendation video sequence. Therefore, after counting the quantity n of target videos in the sub-sequence, the computer device 1 is configured to further determine whether n is greater than or equal to a preset threshold N.

When the quantity n of target videos is greater than or equal to the preset threshold N, the computer device 1 is configured to set the modified recommendation score of the first video to 0. For example, in the video sequence segment, it is not allowed that more than half of videos have a same tag attribute, and if more than half of videos have a same tag attribute, for example, more than five of 10 videos have an animation tag, the computer device 1 sets the recommendation score of the pre-added first video with an animation tag to 0. In this manner, consecutive videos having a same target attribute may be limited, thereby reducing continuous or high-frequency occurrence of a same type of videos.

Figure 3:
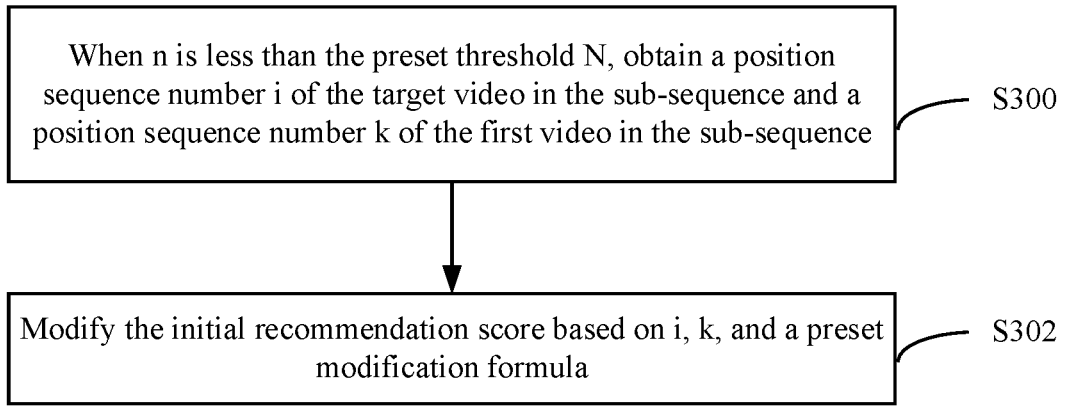
FIG. 3 is a schematic flowchart of a specific embodiment of step S208 in FIG. 2.

Referring to FIG. 3, when the quantity n is less than the preset threshold N, the modifying the initial recommendation score of the first video based on n and a ranking distance between each target video and the first video, to obtain a modified recommendation score includes:

Step S300: Obtain a position sequence number i of the target video in the sub-sequence and a position sequence number k of the first video in the sub-sequence.

Step S302: Modify the initial recommendation score according to the position sequence number i of the target video, the position sequence number k of the first video, and a preset modification formula.

In this embodiment, the target attribute includes a tag attribute and an uploader attribute, and the modification formula includes:

$$score'_k = \frac{score_k}{count(tags_k)} * \left( \sum_{tag=1}^{count(tags_k)} \prod_{i=0}^{k-1} \left(1 - \frac{1}{count(tags_i)} * demote(distance(i,k), tag)\right) \right) * \prod_{i=0}^{k-1}(1 - demote(distance(i,k), up));$$

where $score_k$ represents the initial recommendation score of the first video, $score'_k$ represents the modified recommendation score of the first video, count(tagsk) represents a quantity of tag attributes of the first video, count(tagsi) represents a quantity of tag attributes of the target video, demote(distance(i, k), tag) represents a first modification function associated with tag attributes, demote(distance(i, k), up) represents a second modification function associated with uploader attributes indicating information about users who uploads videos. The first modification function and the second modification function are attenuation functions whose value domain is [0, 1], i.e., whose value is greater than or equal to 0 and less than or equal to 1 and include a linear function or a quadratic function. Specifically, the first modification function is used to modify the initial recommendation score of the first video based on a difference between position sequence numbers of a target video of a same tag attribute and the first video; and the second modification function is used to modify the initial recommendation score of the first video based on a difference between position sequence numbers of a target video of a same uploader attribute and the first video.

In a specific embodiment, when both the first modification function and the second modification function are half-life functions, the modification formula includes:

$$score'_k = \frac{score_k}{count(tags_k)} *$$

$$\left( \sum_{tag=1}^{count(tags_k)} \prod_{i=0}^{k-1} \left(1 - \frac{1}{count(tags_i)} \left(\frac{1}{2}\right)^{\frac{distance(i,k)}{T_{tag}}}\right) \right) * \prod_{i=0}^{k-1}\left(1 - \left(\frac{1}{2}\right)^{\frac{distance(i,k)}{T_{up}}}\right);$$

where Ttag represents a preset attenuation constant according to a tag attribute, and Tup represents a preset attenuation constant according to an uploader attribute. In a specific embodiment, Ttag and Tup are attenuation parameters obtained by means of offline evaluation or online experiments. Specifically, Ttag and Tup are set offline according to an initial recommendation score of a video in a to-be-selected video set, user information, a user behavior record, and video information in the to-be-selected video set, for example, a distribution status of a plurality of tag attributes included in all videos, a probability of occurrence of videos of a same tag/video uploader, a probability of a same type of videos being at an interval of 1/2/3/x, a probability of occurrence of a same type of videos within consecutive 5/6/x videos, a percentage change of a video category seen by each user, and a history interactive rate indicator of a selected video. Alternatively, a preset online recommendation engine is used to create a layer of diversity control experiment, and test, according to experimental access traffic, online recommendation indicator quality and evaluate each group of weight reduction parameters according to remaining data, so as to select optimal Ttag and Tup.

In another specific embodiment, the computer device 1 may further obtain a corresponding target user attribute from a user terminal for which recommendation is performed, and then modify the initial recommendation score of the first video according to n and the sorting distance between each target video and the first video with reference to the target user attribute and/or a video type of the first video, to obtain a modified recommendation score corresponding to the target user.

Specifically, in an embodiment, the target user attribute and the video type of the first video may be respectively corresponding to different modification parameters to modify the initial recommendation score. For example, for different target user attributes and different video types, the initial recommendation score of the video may be directly weighted or weight-reduced. Alternatively, in another embodiment, because a degree of acceptance of each user for continuously watching video content of a same type is different, a target user attribute of a target user for which recommendation is performed may be first obtained. The target user attribute includes attenuation constants Ttag and Tup of the user for different types of video content. Therefore, the computer device 1 may select corresponding Ttag and Tup from the obtained target user attribute according to the video type of the first video, and then combine the corresponding Ttag and Tup with the foregoing described modified recommendation score calculation method, so as to obtain the modified recommendation score corresponding to the target user.

Step S210: Put the first video back to the to-be-selected video set.

Step S212: Select a video with a highest modified recommendation score from the to-be-selected video set and add it to the last position of the recommendation video sequence.

After the modified recommendation score of the first video is obtained, the computer device 1 is configured to put the first video back to the to-be-selected video set. When initial recommendation scores of all videos in the to-be-selected video set are modified in the manner as described above, the computer device 1 is further configured to select a video with a highest modified recommendation score from the to-be-selected video set, and formally adds it to the last position of the recommendation video sequence.

The computer device 1 is configured to temporarily pre-adds a video in the to-be-selected video set to a recommendation video sequence, then establish an evaluation effective range/sliding window (e.g., the sub-sequence) for the recommendation video sequence, and then modify an initial recommendation score of the pre-added video based on other videos in the evaluation effective range/sliding window that share a same tag attribute or uploader attribute. The effective range/sliding window may be introduced, for example, a video of a same type that is far away from a to-be-selected position may be directly ignored, and online calculation time may be reduced.

Figure 4:
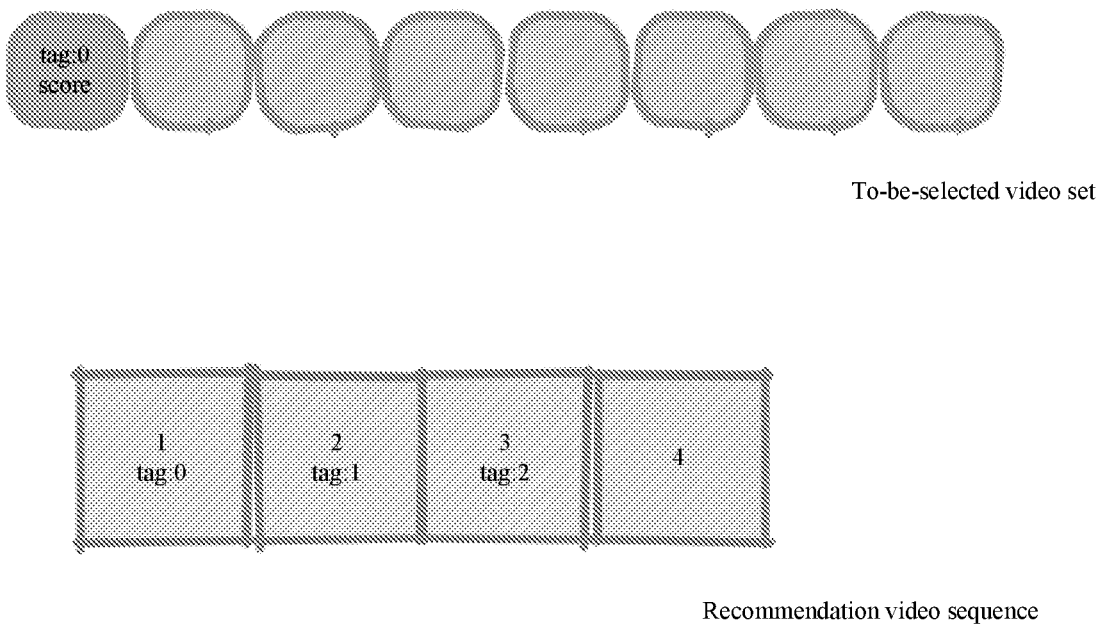
FIG. 4 is an effect diagram of a video content recommendation method according to a specific embodiment of this application.

Referring to FIG. 4, FIG. 4 is an effect diagram of a video content recommendation method according to an example of this application.

In this embodiment, the computer device 1 selects the 1st video from the to-be-selected video set and temporarily pre-adds it to the last position of the recommendation video sequence, e.g., the last position with a sequence number 4, in the recommendation video sequence as shown in FIG. 4. In this example, a preset quantity of videos included in a sub-sequence is four. Then four videos including the sequence number 4 are captured as a sub-sequence. A target attribute of the first video, that is, tag:0 and an initial recommendation score "score" are obtained, and then a video with tag:0 in the sub-sequence, that is, a video with a sequence number 1 in the sub-sequence segment is found. Next, the computer device 1 is configured to calculate a modified recommendation score (i.e., score') of the first video based on the formula $$\text{score}' = \text{score} * \left(1 - \left(\frac{1}{2}\right)^{\frac{4-1}{T_0}}\right),$$

and then put the first video back to the to-be-selected video set. The computer device 1 is configured to consecutively modify initial recommendation scores of videos included in the to-be-selected video set in the same manner, and then select a video with a highest modified recommendation score and adds it to the position with the sequence number 4 in the recommendation video sequence.

The computer device 1 described in this application can pre-add a to-be-selected video from a to-be-selected video set to a recommendation video sequence; capture a sub-sequence with a preset quantity of videos that includes the first video; modify an initial recommendation score of the first video according to a position sequence number of the first video in the sub-sequence and a position sequence number of another video sharing a target attribute of the first video in the sub-sequence to obtain a modified recommendation score; and finally select a final to-be-selected video and add it to the recommendation video sequence based on the modified recommendation scores. Therefore, diversity control is implemented by accumulating negative influence of a same type of videos comprising similar videos. Therefore, diversity of recommendation content is improved, and flexibility of a recommendation manner is also improved.

For a video content recommendation manner in the prior art, for example, according to a simple diversity limitation rule, this rule is to limit a recommendation quantity of video content of a same type. For example, in a video content recommendation process, among five videos recommended to a user, there cannot be more than two videos of a same type. Therefore, when this rule is applied to all users, it is difficult to balance the limitation rule and recommendation indicator. In addition, different processing of different types of videos in this rule is determined based on human experience, and cannot be further improved and expanded. For another example, video content recommendation is performed according to a maximal marginal relevance (MMR) manner, where MMR is used to select only a video with a largest similarity to reduce a weight, and a returned result is a reduced weight of a video of a same type. In this manner, weight reduction of videos of different video types in a video sequence is not considered. For example, it is determined, based on experience in a recommendation scenario, that occurrence of continuous videos of a same type causes worse experience than occurrence of intermittent videos of a same type. During selection, only a video with highest relevance with selected videos of a same type is selected for negative influence, that is, weight reduction, without superimposition of a plurality of same type of videos.

Compared with the simple rule manner, this application can support more personalized recommendation, have a better control capability for a recommendation video category ratio, and obtain better user satisfaction from a user consumption perspective. Compared with the MMR manner, in this application, a plurality of selected videos of a same type can accumulate negative influence on an alternative video. Therefore, if some reasons have caused a relatively high-frequency occurrence of a plurality of videos of a same type, a possibility of subsequent occurrence of videos of a same type decreases more quickly. More personalized recommendation capabilities are supported, and different users and different types of videos are differently processed. It may be learned from the foregoing that this application can implement:

1. Different tags/video uploaders can exert negative influence on a subsequent same type of videos to different degrees. For example, mutual exclusion of wallpaper videos may be set to be stronger, mutual exclusion of funny videos may be set to be slightly weaker, and negative influence is adjusted based on indicator data and an operation direction, thereby achieving better performance and interpretation.
2. A plurality of selected videos of a same type can accumulate negative influence on an alternative video. Therefore, if some reasons have caused a relatively high-frequency occurrence of a plurality of videos of a same type, a possibility of subsequent occurrence of videos of a same type decreases more quickly.
3. Easy expansion is allowed to support making more personalized recommendation for preferences (and watching duration) of different users for videos of the same type.

That is, in this application, the similarity between the to-be-selected video and all similar videos, and the location distance in the sequence can be comprehensively considered in the entire recommendation video sequence, so as to ensure an indicator effect of the recommendation system (a like rate, a follow rate, an overall interactive rate, and the like), and entire recommendation calculation can be completed in the online recommendation system by using less resource consumption and less response time.

Embodiment 2

Figure 5:
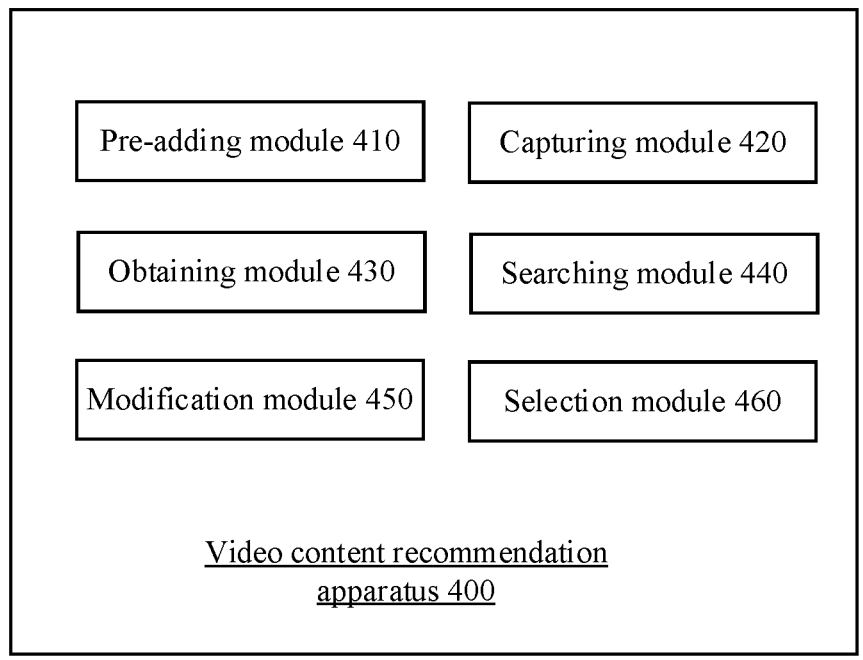
FIG. 5 is a schematic diagram of a program module of an embodiment of a video content recommendation apparatus according to this application.

FIG. 5 is a schematic block diagram of a video content recommendation apparatus according to Embodiment 2 of this application. The video content recommendation apparatus may be divided into one or more program modules. The one or more program modules are stored in a storage medium and executed by one or more processors, so as to complete this embodiment of this application. The program module in this embodiment of this application is a series of computer-readable instruction segments that can be used to complete a specified function. The following specifically describes a function of each program module in this embodiment.

As shown in FIG. 5, the video content recommendation apparatus 400 may include a pre-adding module 410, a capturing module 420, an obtaining module 430, a searching module 440, a modification module 450, and a selection module 460.

The pre-adding module 410 is configured to successively select a to-be-selected video from a to-be-selected video set and pre-add it as a first video to the last position of a recommendation video sequence;

the capturing module 420 is configured to capture, in the recommendation video sequence, a video sequence segment of a preset quantity of videos that include the first video;

the obtaining module 430 is configured to obtain a target attribute and an initial recommendation score of the first video;

the searching module 440 is configured to: search the video sequence segment for a target video with the target attribute other than the first video, and count a quantity n of target videos;

the modification module 450 is configured to modify the initial recommendation score of the first video according to n and a sorting distance between each target video and the first video, to obtain a modified recommendation score;

the selection module 460 is configured to put the first video back to the to-be-selected video set; and select a video with a highest modified recommendation score from the to-be-selected video set and add it to the last position of the recommendation video sequence.

In an example embodiment, the modification module 450 is further configured to: when n is greater than or equal to a preset threshold N, set the modified recommendation score of the first video to 0; and when n is less than the preset threshold N, obtain a location sequence number i of the target video in the video sequence segment and a location sequence number k of the first video in the video sequence segment; and modify the initial recommendation score according to i, k, and a preset modification formula. The target attribute includes a tag attribute and an uploader attribute, and the modification formula includes:

$$score'_k = \frac{score_k}{count(tags_k)} * \left( \sum_{tag=1}^{count(tags_k)} \prod_{i=0}^{k-1} \left(1 - \frac{1}{count(tags_i)} * demote(distance(i, k), tag) \right) \right) * \prod_{i=0}^{k-1} (1 - demote(distance(i, k), up));$$

where scorek is the initial recommendation score of the first video, score'k is the modified recommendation score of the first video, count(tagsk) is a quantity of tag attributes of the first video, count(tagsi) is a quantity of tag attributes of the target video, demote(distance(i, k), tag) is a first modification function, demote(distance(i, k), up) is a second modification function, tag is the tag attribute, and up is the uploader attribute.

In an example, the first modification function and the second modification function are attenuation functions whose value domain is [0, 1] and include a linear function or a quadratic function. When both the first modification function and the second modification function are half-life functions, the modification formula includes:

$$\text{score}'_k = \frac{\text{score}_k}{\text{count(tags}_k)} *$$

$$\left( \sum_{tag=1}^{count(tags_k)} \prod_{i=0}^{k-1} \left( 1 - \frac{1}{\text{count(tags}_i)} \left(\frac{1}{2}\right)^{\frac{distance(i,k)}{T_{tag}}} \right) \right) * \prod_{i=0}^{k-1} \left( 1 - \left(\frac{1}{2}\right)^{\frac{distance(i,k)}{T_{up}}} \right);$$

where Ttag is a preset attenuation constant according to the tag attribute, and Tup is a preset attenuation constant according to the uploader attribute.

In an example embodiment, the modification module 450 is further configured to obtain a corresponding target user attribute from a user terminal for which recommendation is performed; and modify the initial recommendation score of the first video according to n and the sorting distance between each target video and the first video with reference to the target user attribute and/or a video type of the first video, to obtain a modified recommendation score corresponding to the target user.

Embodiment 3

Figure 6:
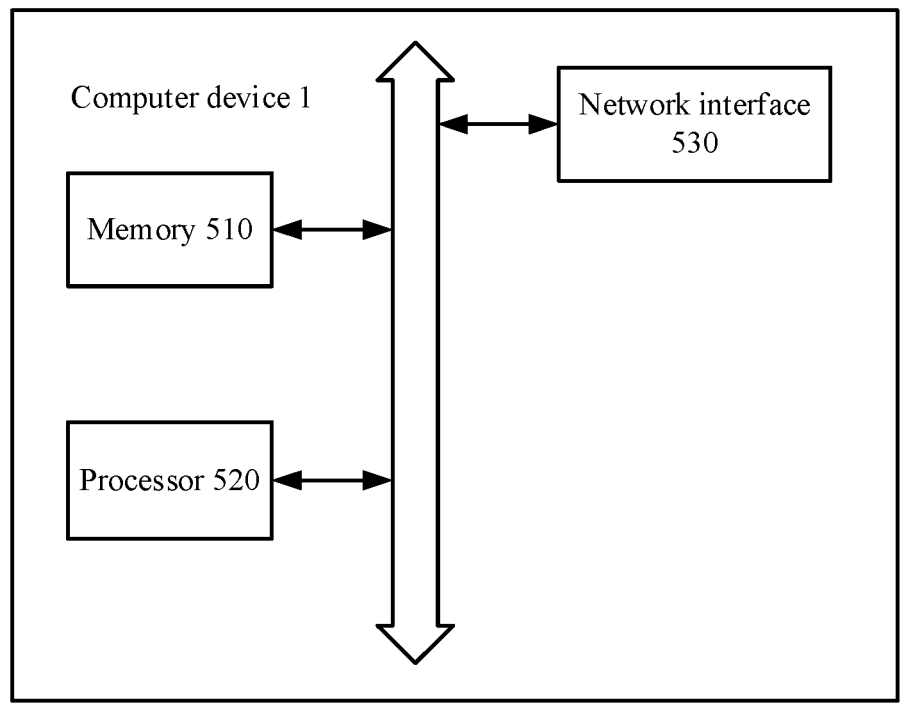
FIG. 6 is a schematic diagram of an optional hardware architecture of a computer device according to this application.

FIG. 6 is a schematic diagram of a hardware architecture of a computer device 1 suitable for implementing a video content recommendation method according to Embodiment 3 of this application. In this embodiment, the computer device 1 is a device that can automatically calculate a value and/or process information based on an instruction that is set or stored in advance. For example, the computer device 1 may be a rack server, a blade server, a tower server, or a cabinet server (including an independent server, or a server cluster including a plurality of servers) that has a gateway function. As shown in FIG. 14, the computer device 1 at least includes but is not limited to: a memory 510, a processor 520, and a network interface 530 that can be communicatively connected to each other by using a system bus.

The memory 510 includes at least one type of computer-readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 510 may be an internal storage module of the computer device 1, such as a hard disk or a memory of the computer device 1. In some other embodiments, the memory 510 may be an external storage device of the computer device 1, for example, a removable hard disk, a smart media card (SMC), a secure digital (SD) card, or a flash card that is disposed on the computer device 1. Certainly, the memory 510 may include both an internal storage module of the computer device 1 and an external storage device of the computer device 1. In this embodiment, the memory 510 is generally configured to store an operating system and various application software that are installed on the computer device 1, for example, program code of the video content recommendation method. In addition, the memory 510 may be further configured to temporarily store various types of data that has been output or is to be output.

The processor 520 may be a central processing unit (CPU), a controller, a microcontroller, a microprocessor, or another data processing chip in some embodiments. The processor 520 is generally configured to control an overall operation of the computer device 1, for example, perform control and processing related to data exchange or communication performed by the computer device 1. In this embodiment, the processor 520 is configured to run program code stored in the memory 510 or process data.

The network interface 530 may include a wireless network interface or a wired network interface, and the network interface 530 is generally configured to establish a communication link between the computer device 1 and another computer device. For example, the network interface 530 is configured to: connect the computer device 1 to an external terminal by using a network, and establish a data transmission channel, a communication link, and the like between the computer device 1 and the external terminal. The network may be a wireless or wired network such as an intranet, the Internet, a global system for mobile communications (GSM), a wideband code division multiple access (WCDMA), a 4G network, a 5G network, Bluetooth, or Wi-Fi.

It should be noted that FIG. 6 shows only a computer device with the components 510 to 530. However, it should be understood that implementation of all the shown components is not required, and more or fewer components may be alternatively implemented.

In this embodiment, the program code of the video content recommendation method stored in the memory 510 or the program code of the video content recommendation method may be divided into one or more program modules, and is executed by one or more processors (the processor 520 in this embodiment), so as to complete this embodiment of this application.

Embodiment 4

This embodiment further provides a computer-readable storage medium. The computer-readable storage medium stores computer-readable instructions. The computer-readable instructions are executed by a processor to implement the following steps:

successively selecting a to-be-selected video from a to-be-selected video set and pre-adding it as a first video to the last position of a recommendation video sequence; capturing, in the recommendation video sequence, a video sequence segment of a preset quantity of videos that include the first video; obtaining a target attribute and an initial recommendation score of the first video; searching the video sequence segment for a target video with the target attribute other than the first video, and counting a quantity n of target videos; modifying the initial recommendation score of the first video according to n and a sorting distance between each target video and the first video, to obtain a modified recommendation score; putting the first video back to the to-be-selected video set; and selecting a video with a highest modified recommendation score from the to-be-selected video set and adding it to the last position of the recommendation video sequence.

In this embodiment, the computer-readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is generally configured to store an operating system and various application software that are installed on the computer device, for example, program code of the video content recommendation method in the embodiments. In addition, the computer-readable storage medium may be further configured to temporarily store various types of data that has been output or is to be output.

Clearly, a person skilled in the art should understand that the modules or steps in the embodiments of this application may be implemented by using a general computing apparatus. The modules or steps may be integrated into a single computing apparatus or distributed in a network including a plurality of computing apparatuses. Optionally, the modules or steps may be implemented by using program code that can be executed by the computing apparatus. Therefore, the modules or steps may be stored in a storage apparatus for execution by the computing apparatus. In addition, in some cases, the shown or described steps may be performed in a sequence different from the sequence herein. Alternatively, the modules or steps may be separately made into integrated circuit modules. Alternatively, a plurality of modules or steps in the modules or steps are made into a single integrated circuit module for implementation. In this way, a combination of any specific hardware and software is not limited in the embodiments of this application.

The foregoing descriptions are merely preferred embodiments in the embodiments of this application, and are not intended to limit the scope of the embodiments of this application. Any equivalent structure or equivalent process change made by using the content of the specification and the accompanying drawings of the embodiments of this application, or when directly or indirectly applied to other related technical fields shall fall within the protection scope of the embodiments of this application.

What is claimed is:

1. A computer-implemented method of performing online video recommendation, comprising:
   retrieving, by a computing device, a set of to-be-selected videos from a video library stored on a video server, the set of to-be-selected videos comprising videos based on video playback interest information determined for a first user and videos predetermined as popular based on viewing activities of a plurality of users;
   consecutively selecting by the computing device a first video from the set of to-be-selected videos and temporarily pre-adding the first video to a last position of a sequence of recommendation videos;
   capturing, by the computing device, from the sequence of recommendation videos, a sub-sequence comprising a preset quantity of videos, wherein the sub-sequence comprises the first video;
   obtaining, by the computing device, a target attribute and an initial recommendation score of the first video;
   identifying, by the computing device, at least one target video in the sub-sequence, wherein the at least one target video has the target attribute and is different from the first video, and determining a quantity n of the at least one target video;
   modifying, by the computing device, the initial recommendation score of the first video based on the quantity n and a position distance between each of the at least one target video and the first video to obtain a modified recommendation score, wherein the modifying the initial recommendation score of the first video based on the quantity n and a position distance between each of the at least one target video and the first video to obtain a modified recommendation score further comprises:
      obtaining a position sequence number i of the at least one target video in the sub-sequence and a position sequence number k of the first video in the sub-sequence in response to determining that the quantity n is less than a preset threshold N, and
      modifying the initial recommendation score based on the position sequence number i of the at least one target video, the position sequence number k of the first video, and a preset modification formula, wherein the preset modification formula comprises:

$$score'_k = \frac{score_k}{count(tags_k)} * \left( \sum_{tag=1}^{count(tags_k)} \prod_{i=0}^{k-1} \left(1 - \frac{1}{count(tags_i)} * demote(distance(i, k), tag)\right) \right) * \prod_{i=0}^{k-1}(1 - demote(distance(i, k), up))$$

wherein $score_k$ represents the initial recommendation score of the first video, $score'_k$ represents the modified recommendation score of the first video, count $(tags_k)$ represents a quantity of tag attributes associated with the first video, $count(tags_i)$ represents a quantity of tag attributes associated with the target video, demote(distance(i, k), tag) represents a first modification function associated with tag attributes, demote(distance(i, k), up) represents a second modification function associated with uploader attributes indicating information about users who uploads videos;
   obtaining, by the computing device, modified recommendation scores of all videos in the set of to-be-selected videos; and
   selecting, by the computing device, a video with a highest modified recommendation score from the set of to-be-selected videos and adding the video with the highest modified recommendation score to the last position of the sequence of recommendation videos.

2. The method according to claim 1, wherein the obtaining a target attribute of the first video comprises:
   in response to determining that the target attribute of the first video is empty, marking a preset video attribute on the first video and identifying the preset video attribute as the target attribute of the first video.

3. The method according to claim 1, wherein the modifying the initial recommendation score of the first video based on the quantity n and a position distance between each of the at least one target video and the first video to obtain a modified recommendation score further comprises:
   in response to determining that the quantity n is greater than or equal to a preset threshold N, setting the modified recommendation score of the first video to 0.

4. The method according to claim 1, wherein the first modification function and the second modification function are attenuation functions whose value is greater than or equal to 0 and less than or equal to 1, and wherein the attenuation functions comprise a linear function or a quadratic function.

5. The method according to claim 1, wherein when both the first modification function and the second modification function are half-life functions, the modification formula comprises:

$$score'_k = \frac{score_k}{count(tags_k)} * \left( \sum_{tag=1}^{count(tags_k)} \prod_{i=0}^{k-1} \left( 1 - \frac{1}{count(tags_i)} \left(\frac{1}{2}\right)^{\frac{distance(i,k)}{T_{tag}}} \right) \right) * \prod_{i=0}^{k-1} \left( 1 - \left(\frac{1}{2}\right)^{\frac{distance(i,k)}{T_{up}}} \right)$$

wherein $T_{tag}$ represents a preset attenuation constant corresponding to a tag attribute, and $T_{up}$ represents a preset attenuation constant corresponding to an uploader attribute.

6. The method according to claim 1, wherein the modifying the initial recommendation score of the first video based on the quantity n and a position distance between each of the at least one target video and the first video and the first video to obtain a modified recommendation score further comprises:
  obtaining a target user attribute associated with a user terminal device to which the video content is recommended; and
  modifying the initial recommendation score of the first video based on the quantity n and the position distance between each of the at least one target video and the first video with reference to the target user attribute to obtain a modified recommendation score corresponding to a target user.

7. A computer device of implementing online video recommendation, wherein the computer device comprises a memory and a processor, computer-readable instructions capable of running on the processor are stored in the memory, and the computer-readable instructions are executable by the processor to implement operations comprising:
  accessing a set of to-be-selected videos from a video library stored on a video server, the set of to-be-selected videos comprising videos based on video playback interest information determined for a first user and videos predetermined as popular based on the viewing activities of a plurality of users;
  consecutively selecting a first video from the set of to-be-selected videos and temporarily pre-adding the first video to a last position of a sequence of recommendation videos;
  capturing, from the sequence of recommendation videos, a sub-sequence comprising a preset quantity of videos, wherein the sub-sequence comprises the first video;
  obtaining a target attribute and an initial recommendation score of the first video;
  identifying at least one target video in the sub-sequence, wherein the at least one target video has the target attribute and is different from the first video, and determining a quantity n of the at least one target video;
  modifying the initial recommendation score of the first video based on the quantity n and a position distance between each of the at least one target video and the first video to obtain a modified recommendation score,
  wherein the modifying the initial recommendation score of the first video based on the quantity n and a position distance between each of the at least one target video and the first video to obtain a modified recommendation score further comprises:
    obtaining a position sequence number i of the at least one target video in the sub-sequence and a position sequence number k of the first video in the sub-sequence in response to determining that the quantity n is less than a preset threshold N, and
    modifying the initial recommendation score based on the position sequence number i of the at least one target video, the position sequence number k of the first video, and a preset modification formula, wherein the preset modification formula comprises:

$$score'_k = \frac{score_k}{count(tags_k)} * \left( \sum_{tag=1}^{count(tags_k)} \prod_{i=0}^{k-1} \left( 1 - \frac{1}{count(tags_i)} * demote(distance(i,k), tag) \right) \right) * \prod_{i=0}^{k-1} (1 - demote(distance(i,k), up))$$

wherein $score_k$ represents the initial recommendation score of the first video, $score'_k$ represents the modified recommendation score of the first video, count($tags_k$) represents a quantity of tag attributes associated with the first video, count($tags_i$) represents a quantity of tag attributes associated with the target video, demote(distance(i, k), tag) represents a first modification function associated with tag attributes, demote(distance(i, k), up) represents a second modification function associated with uploader attributes indicating information about users who uploads videos;
  obtaining modified recommendation scores of all videos in the set of to-be-selected videos; and
  selecting a video with a highest modified recommendation score from the set of to-be-selected videos and adding the video with the highest modified recommendation score to the last position of the sequence of recommendation videos.

8. The computer device according to claim 7, wherein the obtaining a target attribute of the first video comprises:
  in response to determining that the target attribute of the first video is empty, marking a preset video attribute on the first video and identifying the preset video attribute as the target attribute of the first video.

9. The computer device according to claim 7, wherein the first modification function and the second modification function are attenuation functions whose value is greater than or equal to 0 and less than or equal to 1, and wherein the attenuation functions comprise a linear function or a quadratic function; and wherein when both the first modification function and the second modification function are half-life functions, the modification function comprises:

$$score'_k = \frac{score_k}{count(tags_k)} * \left( \sum_{tag=1}^{count(tags_k)} \prod_{i=0}^{k-1} \left( 1 - \frac{1}{count(tags_i)} \left(\frac{1}{2}\right)^{\frac{distance(i,k)}{T_{tag}}} \right) \right) * \prod_{i=0}^{k-1} \left( 1 - \left(\frac{1}{2}\right)^{\frac{distance(i,k)}{T_{up}}} \right)$$

wherein Ttag represents a preset attenuation constant corresponding to the tag attribute, and Tup represents a preset attenuation constant corresponding to the uploader attribute.

10. The computer device according to claim 7, wherein the modifying the initial recommendation score of the first video based on the quantity n and a position distance between each of the at least one target video and the first video to obtain a modified recommendation score further comprises:
   obtaining a target user attribute associated with a user terminal device to which the video content is recommended; and
   modifying the initial recommendation score of the first video based on the quantity n and the position distance between each of the at least one target video and the first video with reference to the target user attribute to obtain a modified recommendation score corresponding to a target user.

11. A non-transitory computer-readable storage medium, wherein the computer-readable storage medium stores computer-readable instructions, and the computer-readable instructions are capable of being executed by at least one processor to enable the at least one processor to perform operations comprising:
   retrieving a set of to-be-selected videos from a video library stored on a video server, the set of to-be-selected videos comprising videos based on video playback interest information determined for a first user and videos predetermined as popular based on the viewing activities of a plurality of users;
   consecutively selecting a first video from the set of to-be-selected videos and temporarily pre-adding the first video to a last position of a sequence of recommendation videos;
   capturing, from the sequence of recommendation videos, a sub-sequence comprising a preset quantity of videos, wherein the sub-sequence comprises the first video;
   obtaining a target attribute and an initial recommendation score of the first video;
   identifying at least one target video in the sub-sequence, wherein the at least one target video has the target attribute and is different from the first video, and determining a quantity n of the at least one target video;
   modifying the initial recommendation score of the first video based on the quantity n and a position distance between each of the at least one target video and the first video to obtain a modified recommendation score, wherein the modifying the initial recommendation score of the first video based on the quantity n and a position distance between each of the at least one target video and the first video to obtain a modified recommendation score further comprises:
      obtaining a position sequence number i of the at least one target video in the sub-sequence and a position sequence number k of the first video in the sub-sequence in response to determining that the quantity n is less than a preset threshold N, and
      modifying the initial recommendation score based on the position sequence number i of the at least one target video, the position sequence number k of the first video, and a preset modification formula, wherein the preset modification formula comprises:

$$\text{score}'_k = \frac{\text{score}_k}{\text{count}(\text{tags}_k)} * \left( \sum_{tag=1}^{count(tags_k)} \prod_{i=0}^{k-1} \left(1 - \frac{1}{\text{count}(\text{tags}_i)} * \text{demote}(\text{distance}(i,k), \text{tag})\right) \right) * \prod_{i=0}^{k-1} (1 - \text{demote}(\text{distance}(i,k), \text{up}))$$

wherein $\text{score}_k$ represents the initial recommendation score of the first video, $\text{score}'_k$ represents the modified recommendation score of the first video, count($\text{tags}_k$) represents a quantity of tag attributes associated with the first video, count($\text{tags}_i$) represents a quantity of tag attributes associated with the target video, demote(distance(i, k), tag) represents a first modification function associated with tag attributes, demote(distance(i, k), up) represents a second modification function associated with uploader attributes indicating information about users who uploads videos;
   obtaining modified recommendation scores of all videos in the set of to-be-selected videos;
   selecting a video with a highest modified recommendation score from the set of to-be-selected videos and adding the video with the highest modified recommendation score to the last position of the sequence of recommendation videos.

12. The non-transitory computer-readable storage medium according to claim 11, wherein the obtaining a target attribute of the first video comprises:
   in response to determining that the target attribute of the first video is empty, marking a preset video attribute on the first video and identifying the preset video attribute as the target attribute of the first video.

13. The non-transitory computer-readable storage medium according to claim 11, wherein the first modification function and the second modification function are attenuation functions whose value is greater than or equal to 0 and less than or equal to 1, and wherein the attenuation functions comprise a linear function or a quadratic function.

14. The non-transitory computer-readable storage medium according to claim 11, wherein when both the first modification function and the second modification function are half-life functions, the modification formula comprises:

$$\text{score}'_k = \frac{\text{score}_k}{\text{count}(\text{tags}_k)} * \left( \sum_{tag=1}^{count(tags_k)} \prod_{i=0}^{k-1} \left(1 - \frac{1}{\text{count}(\text{tags}_i)} \left(\frac{1}{2}\right)^{\frac{distance(i,k)}{T_{tag}}}\right) \right) * \prod_{i=0}^{k-1} \left(1 - \left(\frac{1}{2}\right)^{\frac{distance(i,k)}{T_{up}}}\right)$$

wherein Ttag represents a preset attenuation constant corresponding to the tag attribute, and Tup represents a preset attenuation constant corresponding to the uploader attribute.

* * * * *